United States Patent
Satoh et al.

(10) Patent No.: US 7,969,681 B2
(45) Date of Patent: Jun. 28, 2011

(54) DISK DRIVE AND CONTROL METHOD THEREOF

(75) Inventors: Noriaki Satoh, Kanagawa (JP); Toyomi Ohsawa, Kanagawa (JP); Yumi Nagano, Kanagawa (JP); Nobumasa Nishiyama, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1099 days.

(21) Appl. No.: 11/789,626

(22) Filed: Apr. 24, 2007

(65) Prior Publication Data

US 2007/0247744 A1 Oct. 25, 2007

(30) Foreign Application Priority Data

Apr. 25, 2006 (JP) .................................. 2006-120521

(51) Int. Cl.
*G11B 21/02* (2006.01)
(52) U.S. Cl. ......................................................... 360/75
(58) Field of Classification Search .................... 360/53, 360/59, 54, 55
See application file for complete search history.

(56) References Cited

U.S. PATENT DOCUMENTS

| 4,557,236 A * | 12/1985 | Showalter ...................... 123/435 |
| 6,724,550 B2 * | 4/2004 | Lim et al. ......................... 360/25 |
| 6,886,898 B2 * | 5/2005 | Kojoh et al. .................... 347/10 |
| 7,088,543 B2 | 8/2006 | Satoh et al. |
| 7,551,384 B1 * | 6/2009 | McFadyen et al. ............. 360/67 |
| 2002/0067645 A1 * | 6/2002 | Ohmori et al. ................ 365/200 |
| 2003/0122899 A1 * | 7/2003 | Kojoh et al. .................... 347/68 |
| 2008/0062552 A1 * | 3/2008 | Makifuchi ....................... 360/31 |
| 2009/0323214 A1 * | 12/2009 | Grundvig et al. .............. 360/53 |

FOREIGN PATENT DOCUMENTS

JP 2004-342151 12/2004

* cited by examiner

*Primary Examiner* — Daniell L Negrón
*Assistant Examiner* — Huy D Nguyen
(74) *Attorney, Agent, or Firm* — Mahamedi Paradice Kreisman LLP; Christopher J. Brokaw

(57) ABSTRACT

Embodiments in accordance with the present invention reduce the structural stress applied to a head, and to achieve the effective control, when the clearance between the head and a disk is adjusted by using a heater. According to one embodiment, the hard disk controller/microprocessing unit (HDC/MPU) controls a slew rate of a heater at the time of TFC (Thermal Fly height Control). In response to processing conditions, a HDC/MPU changes a slew rate of the output of electric current/voltage applied to the heater. This makes it possible to reduce the head stress, and to achieve the effective TFC. To be more specific, with reference to a temperature/slew rate table, the HDC/MPU changes a slew rate in response to the temperature in the read/write processing.

11 Claims, 7 Drawing Sheets

Fig. 5(a)

Temperature/slew rate table
(preheating is performed)

|       | LOW  | NOMINAL | HIGH   |
|-------|------|---------|--------|
| WRITE | 20us | 20us    | NONUSE |
| READ  | 1us  | 10us    | 20us   |

Fig. 5(b)

Temperature/slew rate table
(preheating is not performed)

|       | LOW | NOMINAL | HIGH |
|-------|-----|---------|------|
| WRITE | 1us | 10us    | 20us |
| READ  | 1us | 10us    | 20us |

DISK DRIVE AND CONTROL METHOD THEREOF

CROSS-REFERENCE TO RELATED APPLICATION

The instant nonprovisional patent application claims priority to Japanese Patent Application No. 2006-120521 filed Apr. 25, 2006 and incorporated by reference in its entirety herein for all purposes.

BACKGROUND OF THE INVENTION

Devices using various types of media such as optical disks, magnetic optical disks, and a flexible magnetic disk are known in the art as disk drives. Among them, hard disk drives (hereinafter referred to as HDDs) have become popular as storage devices for computers to such an extent that they are one of the storage devices indispensable for modern computer systems. Further, not limited to the computers as described above, HDDs are expanding more and more in application due to their excellent properties. For example, HDDs are used for moving picture recording/reproducing devices, car navigation systems, cellular phones, and removable memories for use in digital cameras.

A magnetic disk used in the HDD has a plurality of data tracks that are concentrically formed. A plurality of pieces of servo data each having address information, and a plurality of data sectors each including user data, are written to each data track. A plurality of data sectors are written between servo data areas. By accessing, according to the address information of the servo data, a desired data sector by use of a head element of a head slider supported by an actuator that pivotally moves, it is possible to write data to the data sector or to read data from the data sector.

In order to improve the recording density of a magnetic disk, it is important to reduce the clearance between the magnetic disk and a head element flying above the magnetic disk. For this reason, some mechanisms for adjusting the clearance are proposed. As one example of the mechanisms, a head slider includes a heater, and the clearance is adjusted by heating a head element by use of the heater. In this specification, this is called TFC (Thermal Fly height Control). According to the TFC, an electric current is supplied to a heater to generate heat, which causes a head element to protrude. This makes it possible to reduce the clearance between a magnetic disk and the head element. The TFC is disclosed in, for example, Japanese Patent Laid-Open No. 2004-342151 (patent document 1). Patent document 1 discloses that in order to prevent crosstalk from causing noises in a read signal, tilts of the rising and falling edges of an electric current supplied to a heater are reduced.

If the TFC is adopted, a heater is repeatedly turned ON/OFF several trillions of times during the use of the HDD. Because of it, the long-term reliability of the TFC becomes a major concern. As a result of the study of the inventors, it has been found that if a heater is repeatedly turned ON/OFF by TFC, the structural stress is applied to the heater and the head element, which may cause a device breakdown. The thermal expansion and thermal shrinkage cause metal fatigue of materials of the heater. As a result, the breakage of the heater, and a short circuit by electromigration, may occur. In addition, in the boundary between the heater and a surrounding member thereof, a crack may occur due to the difference in material between them. In another case, because a read element and a write element repeatedly expand and shrink, a crack occurs in such part, or the electromigration is accelerated.

As one of methods for reducing the structural stress applied to the heater and the head element, it is thought that a slew rate of the output to the heater element from a preamplifier (the speed of the rising edge/falling edge of a signal waveform) is decreased. However, because the useless decrease in slew rate causes the response speed of the clearance adjustment to decrease, it is thought that the intended purpose of the TFC cannot be achieved depending on processing conditions.

BRIEF SUMMARY OF THE INVENTION

Embodiments in accordance with the present invention reduce the structural stress applied to a head, and achieve the effective control, when the clearance between the head and a disk is adjusted by using a heater. According to the particular embodiment of the present invention shown in FIG. 4, the hard disk controller/microprocessing unit (HDC/MPU) 23 controls a slew rate of a heater at the time of TFC (Thermal Fly height Control). In response to processing conditions, a HDC/MPU 23 changes a slew rate of the output of electric current/voltage applied to the heater. This makes it possible to reduce the head stress, and to achieve the effective TFC. To be more specific, with reference to a temperature/slew rate table 242, the HDC/MPU 23 changes a slew rate in response to the temperature in the read/write processing.

BRIEF DESCRIPTION OF THE DRAWINGS

FIGS. 5(a) and 5(b) are diagrams each schematically illustrating an example of a temperature/slew rate table according to an embodiment of the present invention.

DETAILED DESCRIPTION OF THE INVENTION

Figure 1:
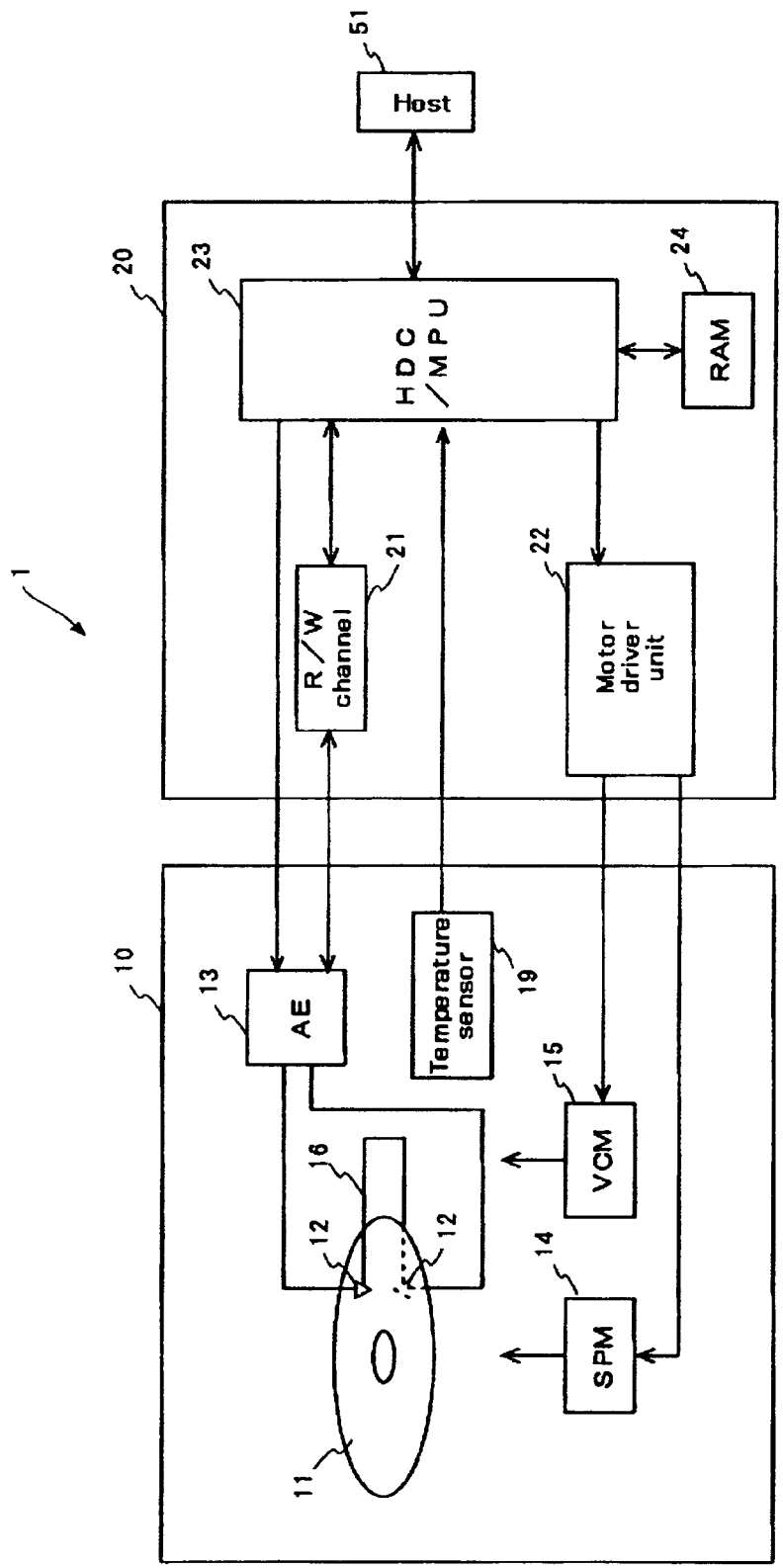
FIG. 1 is a block diagram schematically illustrating how a HDD according to an embodiment of the present invention is configured as a whole.

Embodiments in accordance with the present invention relate to a disk drive and a control method thereof, and more particularly to the heater control of a disk drive that is equipped with a heater for adjusting the clearance between a head element and a disk.

According to an embodiment of the present invention, there is provided a disk drive comprising: a slider that flies above a rotating disk; a head element located at the slider; a heater that uses thermal expansion to cause the head element to protrude so that the clearance between the head element and the disk is adjusted, the heater being located at the slider;

a controller for determining a slew rate of the output to the heater in response to processing conditions; and a heater driving circuit for driving the heater at the determined slew rate.

Determining the slew rate of the output to the heater in response to the processing conditions, it is possible to reduce the stress applied to the device, and to achieve the effective TFC.

It may be desirable that the controller change the slew rate of the output to the heater on the basis of the detected temperature detected by a temperature sensor. Adjusting the slew rate on the basis of temperature conditions, it is possible to achieve more suitable TFC. In addition, it may be desirable that at the time of read processing and/or write processing, the controller determine the slew rate of the output to the heater so that a slew rate on the low temperature side becomes higher than or equal to that on the high temperature side. This makes it possible to compensate for the decrease in read and/or write properties on the low temperature side.

In read processing and/or write processing, while the head element is accessing the disk, the driving circuit can make the slew rate of the output to the heater lower than that at the time of starting the access. As a result, it is possible to suppress the decrease in read and/or write properties at the time of starting the access. In addition, the driving circuit decreases the slew rate of the output to the heater according to the number of times a read control signal and/or a write control signal received from the controller has been changed. This makes it possible to carry out the slew-rate control by a simple and easy configuration.

The disk drive further comprises a table including a step of, if an error occurs, identifying an execution step of error recovery processing thereof, and then changing the slew rate; and the controller is capable of controlling the execution of the execution step identified by the table. Moreover, the table can include, as an error recovery step in read processing, a step of increasing and/or decreasing the slew rate. In another case, the controller executes check processing of checking data that has been written by the head element in write processing; and the table can include, as an error recovery step in the write processing, a step of increasing the slew rate. By changing the slew rate in the error recovery processing, it is possible to achieve error recovery.

According to another embodiment of the present invention, there is provided a control method of a disk drive, the disk drive comprising: a slider that flies above a rotating disk; a head element located at the slider; and a heater that uses thermal expansion to cause the head element to protrude so that the clearance between the head element and the disk is adjusted, the heater being located at the slider. The control method comprising the steps of: determining a slew rate of the output to the heater in response to processing conditions; and driving the heater at the determined slew rate. Determining the slew rate of the output to the heater in response to the processing conditions, it is possible to reduce the stress applied to the device, and to achieve the effective TFC. Moreover, it is possible to change the slew rate of the output to the heater according to head switching in read processing and/or write processing. This makes it possible to compensate for the decrease in read and/or write properties at the time of head switching.

According to embodiments of the present invention, it is possible to reduce the stress applied to a device, which is caused by TFC, and to effectively achieve the TFC.

Embodiments of the present invention will be described as below. For clarification of the explanation, omission and simplification are made, where appropriate, in the following description and drawings. Also note that identical reference numerals are used to designate identical elements that are common to the figures, and that redundant description is omitted as appropriate for clarification of the explanation. As an example of disk drives, there are hard disk drives. Taking a hard disk drive (HDD) as an example, an embodiment of the present invention will described as below.

One of the characteristics of this embodiment is the slew-rate control of a heater, which is carried out in TFC (Thermal Fly height Control) of a disk drive. The TFC adjusts the clearance between a head element and a recording disk by thermal expansion that is caused by heat from a heater on a slider. In response to processing conditions, a HDD according to this embodiment changes a slew rate of the output of electric current/voltage applied to this heater. This makes it possible to reduce the head stress, and to achieve the effective TFC.

For easier understanding of the characteristics of this embodiment, first of all, an overall configuration of the HDD will be schematically described. FIG. 1 is a block diagram schematically illustrating an overall configuration of a HDD 1 according to this embodiment. As shown in FIG. 1, the HDD 1 includes a sealed enclosure 10, which houses: a magnetic disk 11 that is an example of a recording disk (recording medium); a head slider 12; arm electronics (AE) 13; a spindle motor (SPM) 14; a voice coil motor (VCM) 15; an actuator 16; and a temperature sensor 19.

The HDD 1 further includes a circuit board 20 that is secured outside the enclosure 10. On the circuit board 20, there are provided ICs including: a read/write channel (RW channel) 21; a motor driver unit 22; an integrated circuit 23 including a hard disk controller (HDC) and a MPU (hereinafter referred to as "HDC/MPU"); and a RAM 24. Incidentally, the above-described circuits can be integrated into one IC; or each circuit can be implemented by dividing the circuit into a plurality of ICs. User data from an external host 51 is received by the HDC/MPU 23, and is sent through the RW channel 21 and the AE 13 before the user data is written to the magnetic disk 11 by the head slider 12. On the other hand, user data stored on the magnetic disk 11 is read out by the head slider 12. This user data is sent through the AE 13 and the RW channel 21, and is then output from the HDC/MPU 23 to the external host 51.

The magnetic disk 11 is secured to the SPM 14. The SPM 14 rotates the magnetic disk 11 at specified angular speed. The motor driver unit 22 drives the SPM 14 according to control data received from the HDC/MPU 23. The magnetic disk 11 according to this embodiment has recording surfaces on both sides. Data is written to each of the recording surfaces. Each recording surface is provided with its corresponding head slider 12. Each head slider 12 includes: a slider that flies above the magnetic disk; and a head element that is secured to the slider and converts between a magnetic signal and an electric signal. The head slider 12 according to this embodiment includes a heater used for TFC in which heating causes the head element to protrude so that the clearance (flying height) between the head element and the magnetic disk 11 is adjusted. A structure of the head slider 12 will be described in detail later with reference to FIG. 2.

Each head slider 12 is secured to the tip of the actuator 16. The actuator 16 is connected to the VCM 15. The actuator 16 pivotally moves about a pivot shaft, which causes the head slider 12 to move in its radial direction above the magnetic disk 11. The motor driver unit 22 drives the VCM 15 according to control data (called DACOUT) that is received from the HDC/MPU 23. It is to be noted that the required number of the magnetic disks 11 is one or more, and that a recording surface can be formed on one side, or both sides, of the magnetic disk 11.

The AE 13 selects from among the plurality of head elements 12 one head element 12 that is used to access the magnetic disk 11, and amplifies at constant gain a read signal read by the selected head element 12, and then transmits the amplified signal to the RW channel 21. In addition, the AE 13 receives a write signal from the RW channel 21, and then transmits the write signal to the selected head element 12. Moreover, the AE 13 supplies an electric current (electric power) to the heater, and functions as an adjustment circuit for adjusting the amount of electric current.

In the read processing, the RW channel 21 amplifies a read signal supplied from the AE 13 so that the amplitude thereof is kept constant, and then extracts data from the obtained read signal to perform decode processing. Data which is read out includes user data and servo data. The read user data and the servo data, which have been decoded, are supplied to the HDC/MPU 23. Additionally, in the write processing, the RW channel 21 performs code modulation of write data supplied from the HDC/MPU 23, and then converts the code-modulated write data into a write signal to supply the write signal to the AE 13.

In the HDC/MPU 23, the MPU operates according to microcodes loaded into the RAM 24. When the HDD 1 is started up, not only microcodes to operate on the MPU but also data required for control and data processing are loaded into the RAM 24 from the magnetic disk 11 or a ROM (not illustrated in the figure). The HDC/MPU 23 executes processing required for data processing such as read/write processing control, management of the command execution order, positioning control (servo control) of the head elements 12 by use of a servo signal, interface control, defect control, and ERP at the time of the occurrence of an error. The HDC/MPU 23 also executes the total control of the HDD 1. In particular, the HDC/MPU 23 according to this embodiment performs the slew-rate control of TFC. However, this point will be described later.

Figure 2:
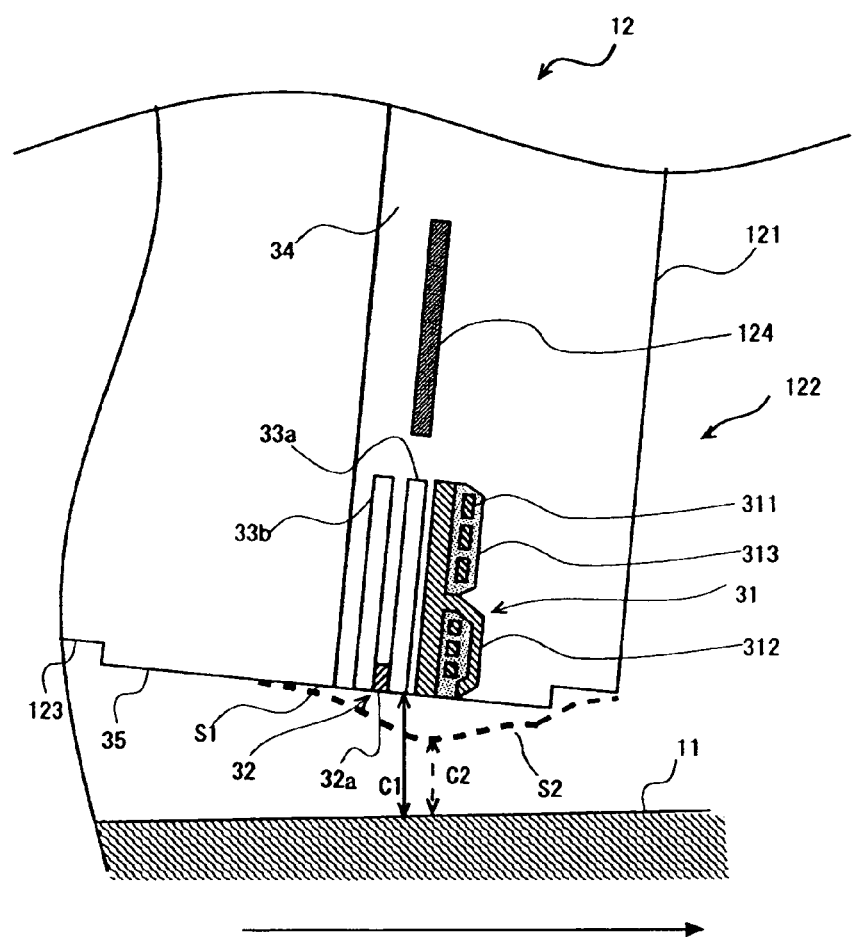
FIG. 2 is a cross section schematically illustrating a configuration of a head slider that is equipped with a heater used for TFC according to an embodiment of the present invention.

Next, a configuration of a TFC head slider 12 according to this embodiment will be described. FIG. 2 is a cross section partially illustrating an area in proximity to an air-outflow end face (trailing-side end face) 121 of the head slider 12. The magnetic disk 11 rotates from left to right in FIG. 2. The head slider 12 includes a head element 122, and a slider 123 for supporting the head element 122. It is to be noted that the TFC according to this embodiment can be applied to both a HDD adopting perpendicular magnetic recording and a HDD adopting longitudinal magnetic recording.

The head element 122 writes/reads magnetic data to/from the magnetic disk 11. The head element 122 includes a read element 32, and a write element 31 existing on its trailing side. The write element 31 is an inductive element that generates a magnetic field between a write coil 311 and a magnetic pole 312 with an electric current flowing through the write coil 311 so as to write the magnetic data to the magnetic disk 11. The read element 32 is a magnetoresistive element. The read element 32 includes a magnetoresistive element 32a having magnetic anisotropy. According to a value of resistance that varies in response to a magnetic field from the magnetic disk 11, the read element 32 reads out magnetic data written to the magnetic disk 11.

By use of a thin-film formation process such as plating, sputtering, and polishing, the head element 122 is formed on an alumina titan carbide (AlTic) substrate constituting the slider 123. The magnetoresistive element 32a is sandwiched between magnetic shields 33a, 33b. The write coil 311 is surrounded by an insulation film 313. In addition, the head element 122 is provided with a protective layer 34 (for example, made of alumina) around the write element 31 and the read element 32. Accordingly, the whole head element 122 is protected by the protective layer 34. Using a thin-film process, an area in proximity to the write element 31 and the read element 32 is provided with a heater 124 comprising a resistor made of a thin film. In this example, the heater 124 is formed in the head element 122 at a position opposite to the magnetic disk 11. It is possible to form the heater 124 in a manner that a thin-film resistor which uses permalloy meanders with a gap being filled with alumina.

When the AE 13 applies an electric current (supplies the electric power) to the heater 124, heat of the heater 124 causes an area in proximity to the head element 122 to protrude and to be transformed. When the heater 124 is not heated, an ABS surface of the head slider 12 has a shape indicated with S1. The clearance which is the distance between the head element 122 and the magnetic disk is indicated with C1. FIG. 2 schematically illustrates, with a broken line, a protruding shape S2 found when the heater 124 is heated. When the head element 122 nears the magnetic disk 11, the clearance C2 is smaller than the clearance C1. Incidentally, FIG. 2 is a conceptual diagram only, and accordingly the dimensional relationship is not drawn to scale. For example, the shape of the protruding surface S2 corresponds to the amount of protrusion in the order of nm (several nanometers).

The head element 122 is repeatedly expanded and enlarged by the TFC. As a result, the thermal expansion and the thermal shrinkage cause metal fatigue of materials of the heater 124. Accordingly, a breakage of the heater 124, and a short circuit by electromigration, may occur. In addition, in the boundary between the heater 124 and a surrounding member thereof, a crack may occur due to the difference in material between them. In another case, because the read element 32 and the write element 31 repeatedly expand and shrink, a crack occurs in such part, or the electromigration is accelerated. The stress which is applied to the read element 32 causes the signal to be unstably read. In general, this is called the instability of the read element 32.

In order to reduce the structural stress applied to the heater 124 and the head element 122, it is desirable to decrease a slew rate of the output to the heater 124. However, because the decrease in slew rate causes the response speed of the clearance adjustment to decrease, it is thought that the intended purpose of the TFC cannot be achieved depending on processing conditions. The HDD 1 according to this embodiment changes a slew rate of the output to the heater 124 in response to the processing conditions. This makes it possible to effectively achieve the TFC, and to reduce the mechanical stress in the head slider 12.

The AE 13 includes a driving circuit for supplying the electric power to the heater 124. Typically, the AE 13 drives the heater 124 by the constant voltage drive or the constant current drive. The slew rate is equivalent to the rising edge of the output from the AE 13 to the heater 124, or to the speed of the falling edge. At a high slew rate, the rising or falling edge of electric current and voltage supplied to the heater 124 is fast. On the other hand, at a low slew rate, the rising or falling edge of electric current and voltage supplied to the heater 124 is slow.

Figure 3A:
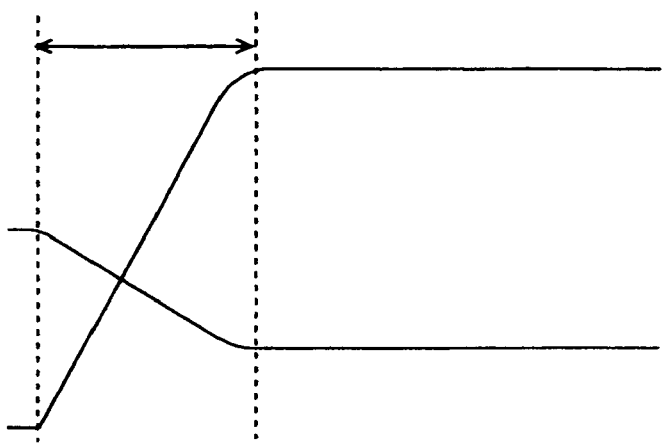
FIGS. 3(a), 3(b) and 3(c) are diagrams each schematically illustrating a change in wave shape of the output to the heater whose slew rate is high, and a change in wave shape of the output to the heater whose slew rate is low, according to an embodiment of the present invention.
Figure 3B:
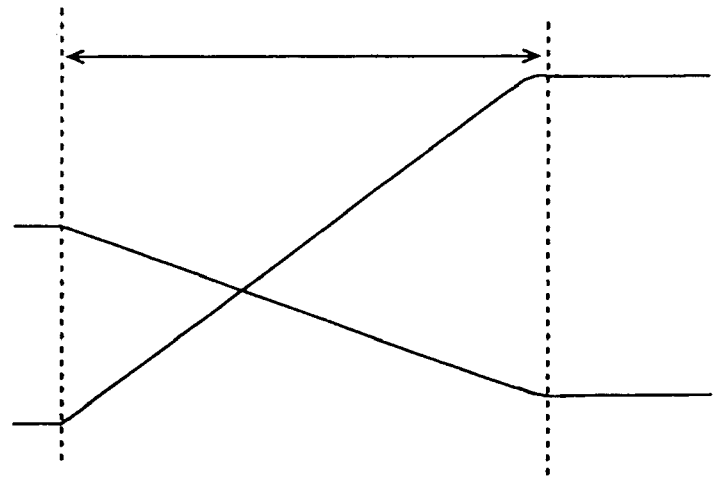
Figure 3C:
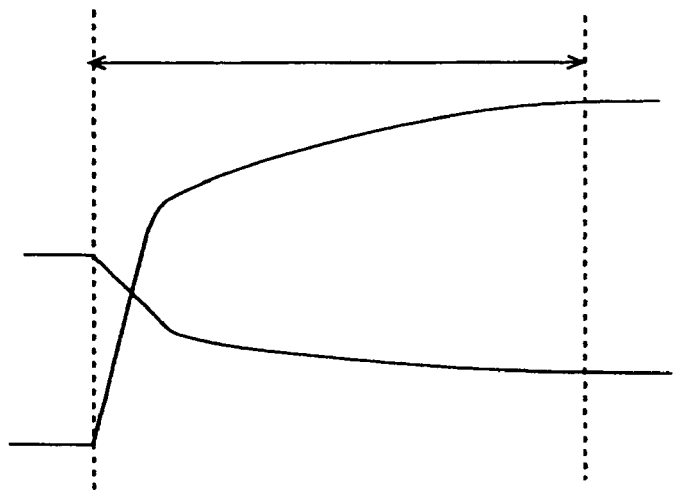

FIGS. 3(a), 3(b) and 3(c) are diagrams each schematically illustrating waveforms of slew rates that differ from each other. In FIGS. 3(a), 3(b) and 3(c), an x axis indicates the time, whereas a y axis indicates the output voltage or the output current. The slew rate shown in FIG. 3(a) is higher than those shown in FIGS. 3(b) and 3(c). To be more specific, the rising and falling edges of the waveforms are fast. As is the case with FIG. 3(b) and FIG. 3(c) illustrates an example of a low slew rate.

To be more specific, a slew rate can be expressed with the time after the change in output from the AE 13 to the heater 124 starts until the change reaches a saturation value thereof. For example, at the rising edge of the constant current drive, it is possible to define a slew rate at the rising edge by use of the time after the AE 13 starts supplying an electric current until a value of the electric current reaches a saturation value thereof. Similarly, at the falling edge of the constant current drive, it is possible define a slew rate at the falling edge by use of the time after an output current of the AE 13 starts decreasing until a value of the output current reaches a saturation value thereof (in other words, the value reaches a 0 level). In the case of the constant voltage drive, it is possible to define the slew rate by use of a voltage value thereof. Incidentally, an example in which the AE 113 drives the heater 124 using the constant current drive will be described as below.

Figure 4:
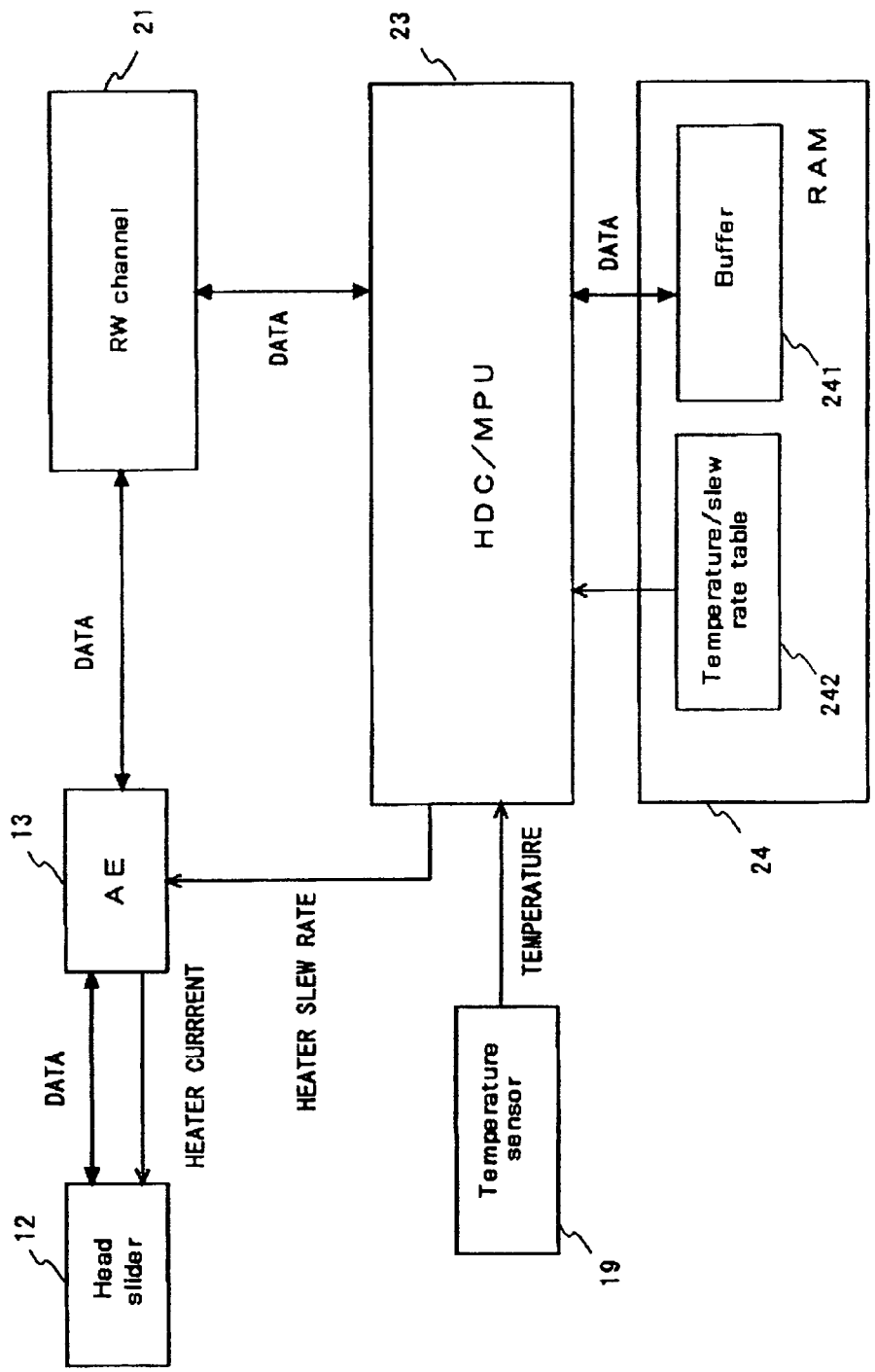
FIG. 4 is a diagram illustrating an example of a temperature/slew rate table that is referred to for the purpose of changing a slew rate in response to the temperature according to an embodiment of the present invention.

One mode is to change a slew rate of the heater 124 according to temperature conditions. In addition, the slew rate is determined in response to read and write processing. Incidentally, the slew-rate control at the time of the rising edge of the heater 124 will be specifically described as below. The HDC/MPU 23 carries out the slew-rate control of the heater 124. FIG. 4 is a block diagram schematically illustrating each functional element relating to the slew-rate control of the heater 124. The AE 13 includes a register, and is capable of changing a slew rate of the output to the heater 124 according to control data set in the register.

The HDC/MPU 23 determines a slew rate of the heater 124 in response to processing conditions, and sets data (HEATER SLEW RATE), which identifies a value of the slew rate, in the register of the AE 13. Typically, from among a plurality of predetermined slew rates, the HDC/MPU 23 determines a slew rate that is most suitable for the processing conditions, and then sets a value thereof in the AE 13. The AE 13 supplies an electric current (HEATER CURRENT) to the heater 124 of the head slider 12 on the basis of the slew rate indicated by the set data.

In the read processing, a data signal (DATA) read out by the head slider 12 is transmitted to the HDC/MPU 23 through the AE 13 and the RW channel 21. The HDC/MPU 23 temporarily stores the read data in the buffer 241 included in the RAM 24, and then transmits the data to the host 51. In the write processing, the HDC/MPU 23 transmits data stored in the buffer 241 to the R/W channel 21. The data is written to the magnetic disk 11 through the AE 13 and the head slider 12.

At the time of both read processing and write processing, the HDC/MPU 23 determines a slew rate in response to the temperature. The HDC/MPU 23 acquires the detected temperature from the temperature sensor 19 such as a thermistor. In addition, according to a command received from the host 51, the HDC/MPU 23 controls the read and write processing, and performs the slew-rate control in response to the temperature in each of the processing.

A temperature/slew rate table 242 is loaded into the RAM 24. The temperature/slew rate table 242 identifies the relationship between the temperature and a slew rate in each of the read and write processing. The temperature/slew rate table 242 is written to, for example, a management area on the magnetic disk 11. When the HDD 1 is turned ON, the temperature/slew rate table 242 is loaded into the RAM 24.

In each of the read and write processing, the HDC/MPU 23 determines a slew rate of the heater 124 with reference to both the detected temperature detected by the temperature sensor 19 and the temperature/slew rate table 242. A preferable example of the slew-rate control carried out in response to the temperature will be specifically described. Each of FIGS. 5(a) and 5(b) illustrates a preferable example of the temperature/slew rate table 242. FIG. 5(a) illustrates an example in which preheating is performed before writing; and FIG. 5(b) illustrates an example in which preheating is not performed before writing.

In the examples shown in FIGS. 5(a) and 5(b), a detected temperature area of the temperature sensor 19 is divided into three temperature areas of a low temperature area (LOW), a normal temperature area (NOMINAL), and a high temperature area (HIGH). For example, the temperature lower than 0° C. is treated as the low temperature; and the temperature ranging from 0° C. to 50° C. is treated as the normal temperature. In addition, a slew rate is set for each of the write processing (WRITE) and the read processing (READ). In response to a change in temperature area, the HDC/MPU 23 determines a slew rate that is suitable for each of the read processing and the write processing. In this example, the HDC/MPU 23 has three slew rate values. The HDC/MPU 23 selects a proper slew rate value from among 1 µs, 10 µs, and 20 µs. Incidentally, these values are merely shown as an example, and accordingly proper values are specifically adopted according to the design of a HDD.

The preheating shown in FIG. 5(a) prevents poor overwriting from occurring in the early stage of writing data. When preheating is performed, the heater 124 is turned ON earlier by for example several servo sectors before a target sector arrives so as to cause the head element 122 to protrude beforehand. At the time of writing, heat generation of the write element 31 to which a write current is supplied causes the head element 122 to protrude (write protrusion). The protrusion of the head element 122, which is caused by the write protrusion, starts at a point of time at which data writing is started. Then, after a lapse of time during which data has been written, the protrusion becomes saturated.

For this reason, there is a case where at the time of starting data writing, a recording surface is not sufficiently magnetized. If the head element 122 protrudes as a result of preheating before the write element 31 starts writing, it is possible to prevent poor overwriting from occurring when writing is started. Typically, the electric power which is the same as that at the time of reading is supplied to the heater 124 by preheating.

Here, the HDC/MPU 23 changes the electric power (electric current) supplied to the heater 124 according to the temperature, and also switches the heater power between the heater power at the time of reading and that at the time of writing. Typically, the heater power at the time of reading out data is larger than that at the time of writing data. Moreover, the HDC/MPU 23 decreases the heater power according to an increase in temperature. The HDC/MPU 23 can change the electric power (electric current) supplied to the heater 124 by setting a value of the electric power of the heater 124 in the register of the AE 13.

In the case of writing, a slew rate becomes an important factor from a viewpoint of preventing the above-described poor overwriting. If preheating is performed, the head element 122 has already protruded by the specified amount. Accordingly, data writing does not require a faster slew rate. Therefore, as shown in FIG. 5(a), in the low temperature area (LOW) and the normal temperature area (NOMINAL), the HDC/MPU 23 selects 20 µs that is the lowest slew rate (the longest rise time). Incidentally, in the example shown in FIG. 4(a), the HDC/MPU 23 brings the heater 124 into an OFF state in the high temperature area (HIGH). In addition, the AE 13 can start the output to the heater 124 concurrently with, or before, the supply of a write current to the write element 31. Moreover, depending on the design, not 20 μs but 10 μs may also be adopted as a slew rate value at the time of writing.

If preheating is not performed, the HDC/MPU 23 changes a slew rate at the time of writing in response to the temperature as shown in FIG. 5(*b*). To be more specific, if the detected temperature of the temperature sensor 19 is included in the low temperature area (LOW), a slew rate of 1 μs is selected. In the low temperature area, the writing property of the write element 31 deteriorates. Therefore, a high slew rate is used to quicken the protrusion of the head element 122. As a result, poor overwriting in the early stage of writing is prevented more reliably.

In contrast to this, in the normal temperature area (NOMINAL) on the higher temperature side, a slew rate (the longer rise time), which is lower than that of the low temperature area (LOW), is selected. To be more specific, as shown in FIG. 5(*b*), the HDC/MPU 23 selects a slew rate of 10 μs in the normal temperature area (NOMINAL). Moreover, in the high temperature area (HIGH) existing on the higher temperature side in comparison with the normal temperature area, the HDC/MPU 23 selects a slew rate of 20 μs. By increasing a slew rate according to a decrease in temperature, it is possible to keep data writing properties unchanged, and thereby to reduce the stress applied to the head element 122. Incidentally, the same slew rate may also be adopted in both the normal temperature area and the high temperature area.

From the viewpoint of SER (Soft Error Rate), a slew rate becomes an important factor in read processing. If the temperature is low, the SER becomes worse. To be more specific, the number of error bits detected at the time of error correction increases. Here, the error bits are detected in data read out from the magnetic disk 11. In order to improve the SER, it is desirable that a slew rate of the output to the heater 124 be high. In this example, as shown in FIGS. 5(*a*) and 5(*b*), the HDC/MPU 23 selects a higher slew rate on the low temperature side.

To be more specific, the HDC/MPU 23 selects 1 μs in the low temperature area (LOW), selects 10 μs in the normal temperature area (NOMINAL), and selects 20 μs in the high temperature area (HIGH). Thus, the HDC/MPU 23 adopts a different slew rate according to the temperature, and determines the slew rate so that a slew rate on the low temperature side becomes lower than or equal to that on the high temperature side. This makes it possible to effectively improve SER at the time of the read TFC, and to reduce the stress applied to the head element 122.

Incidentally, in order to simplify a circuit configuration of the AE 13, it may be desirable to use in stages a plurality of slew rates that differ from one another (use the same slew rate in the same temperature area). In another case, although the circuit configuration becomes complicated, the slew rate may also be consecutively changed according to the temperature.

Even in this case, the HDC/MPU 23 adopts a different slew rate according to the temperature, and determines the slew rate so that a slew rate on the low temperature side becomes higher than or equal to that on the high temperature side. In addition, for both reading and writing, the same or different value can be used as the reference temperature that defines each temperature area. At the time of read processing, in particular, the SER properties decrease in the low temperature area. Accordingly, a slew rate in this area is made higher than that in the other temperature areas, and the same slew rate may also be used in the normal temperature area and the high temperature area.

Figure 6:
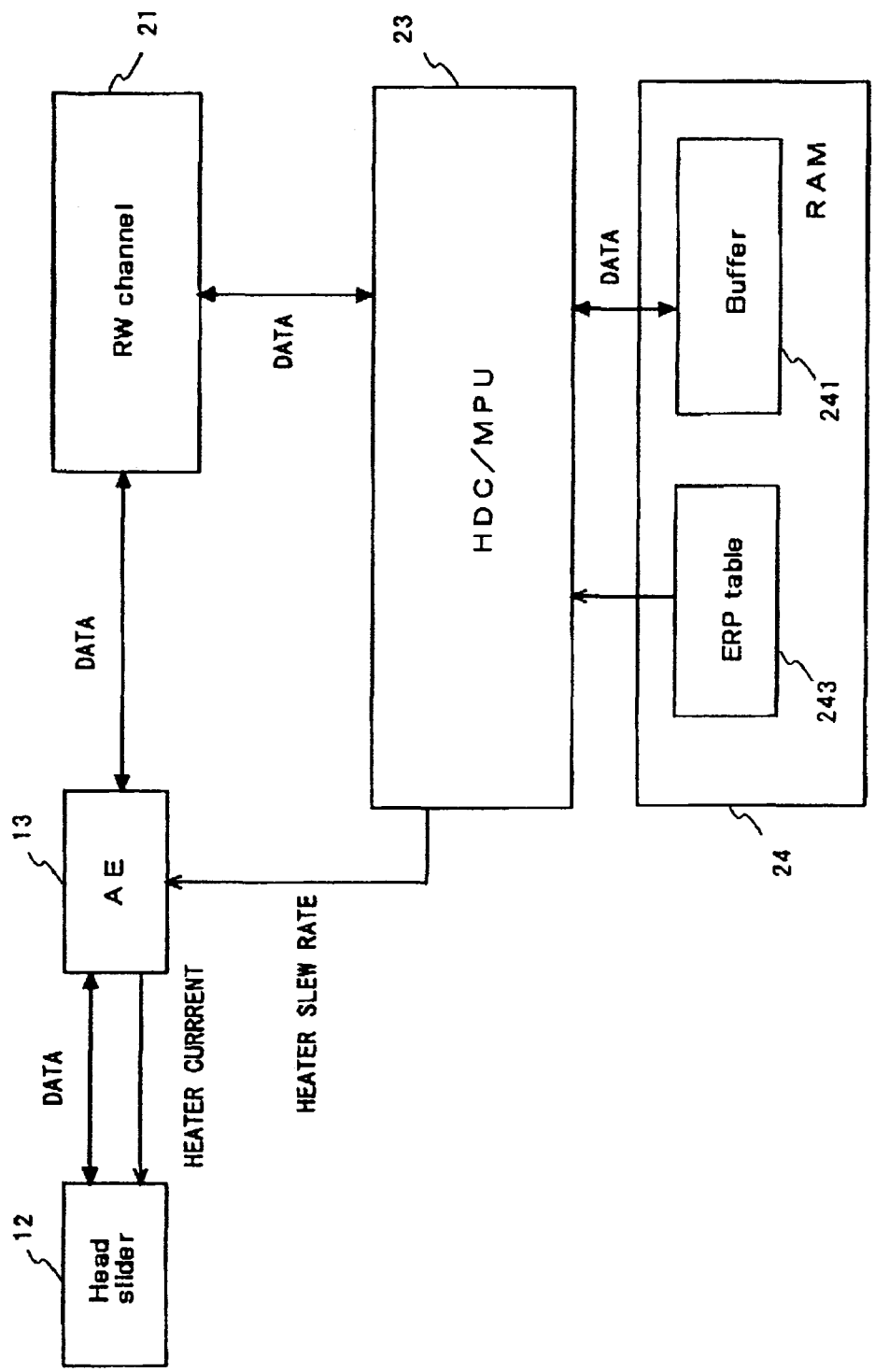
FIG. 6 is a block diagram schematically illustrating a logical configuration relating to changing of a slew rate of a heater in ERP according to an embodiment of the present invention.

In another mode in which a slew rate of the output to the heater 124 is changed in response to the processing conditions, a slew rate which differs from that for normal processing is used in ERP (Error Recovery Procedure). FIG. 6 is a block diagram schematically illustrating functional elements relating to the slew-rate control in the ERP. As shown in FIG. 6, if an error occurs in read or write processing, the HDC/MPU 23 executes ERP with reference to an ERP table 243.

The ERP table 243 includes a table that is capable of handling both reading and writing. The ERP table 243 registers a plurality of ERP steps for each of a read error and a write error. The HDC/MPU 23 successively executes each of the ERP steps. Typical ERP steps include retry under the same conditions, parameter change of the RW channel 21, and an offset of a target position at the time of reading.

As a read ERP step and/or a write ERP step, the ERP table 243 according to this embodiment includes a step of changing a slew rate of the heater 124. To be more specific, if an error has occurred during reading or writing, there is an ERP step of using a slew rate that differs from a slew rate at the time of the occurrence of the error. In response to processing conditions and error conditions, a high slew rate or a low slew rate can be used.

As an example of an ERP step of changing a slew rate, a slew rate is increased in the read ERP. As described above, by increasing a slew rate of the output to the heater 124, an improvement in SER can be expected. As a result, the HDC/MPU 23 can increase a slew rate in the read ERP, and can achieve error recovery.

As still another preferable example, the ERP table 243 includes a step of decreasing a slew rate as one of the read ERP steps. As a result of decreasing a slew rate, it is expected that the mechanical stress applied to the read element 32 will be reduced, and thereby the instability thereof will be suppressed. Therefore, the HDC/MPU 23 can decrease a slew rate in the read ERP, and can achieve error recovery. Incidentally, it is desirable that in the read ERP, the ERP table 243 include both a step of increasing a slew rate, and a step of decreasing the slew rate.

In a further example, the HDC/MPU 23 performs write verification processing. If an error occurs in the write verification processing, the HDC/MPU 23 increases a slew rate in the write ERP. For example, in the low temperature area, the HDC/MPU 23 writes user data to a target sector, and then reads out the user data to check whether or not the user data has been correctly written (write verification processing).

If the data has not been correctly written, the HDC/MPU 23 refers to the ERP table 243, and executes each step of the write ERP. One of the steps is giving an instruction to increase a slew rate of the output to the heater 124. This makes it possible to recover an error caused by poor overwriting in the early stage of data writing.

In still a further mode in which a slew rate of the output to the heater 124 is changed in response to the processing conditions, a slew rate of the output to the heater 124 is changed in response to head switching at the time of reading and/or writing. At the time of the read/write processing, the HDC/MPU 23 selects an access head in response to an address specified by the host 51, and then uses the head element 122 thereof to read/write user data. During accessing corresponding to one command, the HDC/MPU 23 uses one or more head elements 122.

In the early stage after selecting each head element 122, the HDC/MPU 23 uses a high slew rate (FIG. 3(*a*)). After that, in the predetermined timing, the HDC/MPU 23 decreases a slew rate of the output to the heater 124 (FIG. 3(*b*) or 3(*c*)). In the early stage after selecting a head, there is a case where heat of the heater 124 does not cause the head element 122 to sufficiently protrude. For this reason, the HDC/MPU 23 uses a high slew rate to quicken the protrusion of the head element 122. This makes it possible to prevent poor overwriting from occurring in the early stage of writing data, or to prevent a read error from occurring in the early stage of reading out data.

Figure 7:
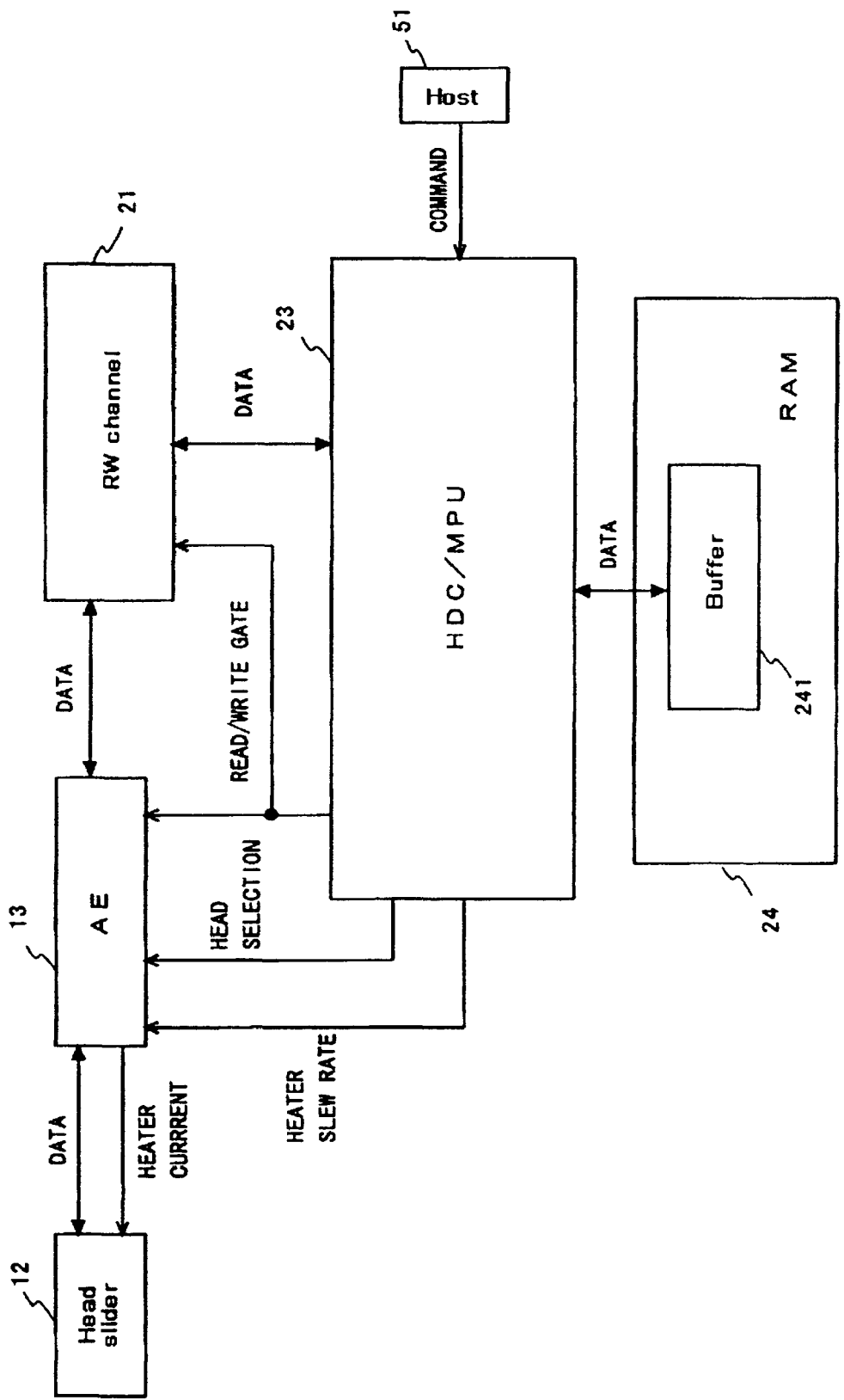
FIG. 7 is a block diagram schematically illustrating a logical configuration relating to changing of a slew rate of a heater in response to head switching according to an embodiment of the present invention.

To be more specific, as shown in a block diagram of FIG. 7, the HDC/MPU 23 acquires read/write commands from the host 51. Each of the commands specifies a top sector of a target to be accessed, and the number of sectors that should be accessed starting from the top sector. Each of the commands issued from the host 51 typically specifies each target to be accessed by use of a LBA (Logical Block Addressing) address. The HDC/MPU 23 converts this LBA address into a CHS (Cylinder Head Sector) address.

By use of the converted CHS address, the HDC/MPU 23 selects the head element 122, and controls the actuator 16. The HDC/MPU 23 sets, in the AE 13, data (HEAD SELECTION) that indicates the selected head element 122. The AE 13 amplifies a read signal received from the selected head element 122, or supplies the head element 122 with a write current. In addition, at the time of the head selection, the HDC/MPU 23 sets data identifying a slew rate in the AE 13.

After that, the HDC/MPU 23 controls the read/write processing of the RW channel 21 by asserting/negating signals (READ/WRITE GATE) for controlling reading/writing. These control signals instruct the start and end of the read/write processing. While a target area is accessed, each of the signals is kept in an ON state. While servo data is handled, each of the signals is kept in an OFF state. The HDC/MPU 23 counts a change in this control signal. If its count value reaches a predetermined value, the HDC/MPU 23 sets, in the AE 13, new data that indicates a low slew rate. The AE 13 drives the heater 124 by using the set slew rate.

In another case, the AE 13 may also include a plurality of registers, each of which sets a slew rate. One register stores set data of an initial slew rate; and each of the other registers stores set data of each subsequent slew rate. The HDC/MPU 23 stores data indicating a slew rate in each of the registers of the AE 13 beforehand.

The control signal (READ/WRITE GATE) received from the HDC/MPU 23 is also inputted into the AE 13. In the early stage after the head selection by the HDC/MPU 23, the AE 13 carries out output to the heater 124 at an initial slew rate stored in the register. The AE 13 counts the number of times the control signal (READ/WRITE GATE) received from the HDC/MPU 23 has been changed. If the number of times reaches the predetermined number of times, the AE 13 switches the slew rate to a low value. Because the number of times the control signal has been changed is counted, it is possible to realize the slew-rate switching by a simple and easy circuit configuration. Incidentally, it may also be so devised that the HDC/MPU 23 counts a clock of the predetermined frequency to measure the time, and a slew rate is changed on the basis of the measured time.

Up to this point, the present invention was described taking the particular embodiments as examples. However, the present invention is not limited to the above-mentioned embodiments. Those skilled in the art will be able to easily make modifications, additions and alterations to each element of the above embodiments within the scope of the preset invention. For example, it is also possible to apply each of the above-described examples of TFC to HDDs, each of which is equipped with a head slider that includes only a read element or a write element, or to disk drives other than HDDs.

What is claimed is:

1. A disk drive comprising:
   a slider that flies above a rotating disk;
   a head element located at the slider;
   a heater that uses thermal expansion to cause the head element to protrude so that the clearance between the head element and the disk is adjusted, said heater being located at the slider;
   a controller for determining a slew rate of the output to the heater in response to processing conditions;
   a heater driving circuit for driving the heater at the determined slew rate; and
   a temperature sensor,
   wherein said controller changes the slew rate of the output to the heater on the basis of the detected temperature detected by the temperature sensor,
   wherein:
   in read processing and/or write processing, while the head element is accessing the disk, the driving circuit makes the slew rate of the output to the heater lower than that at the time of starting the access.

2. The disk drive according to claim 1, wherein:
   in read processing and/or write processing, said controller determines the slew rate of the output to the heater so that a slew rate on the low temperature side becomes higher than or equal to that on the high temperature side.

3. The disk drive according to claim 1, wherein:
   said driving circuit decreases the slew rate of the output to the heater according to the number of times a read control signal and/or a write control signal received from the controller has been changed.

4. The disk drive according to claim 1, further comprising a table including a step of, if an error occurs, identifying an execution step of error recovery processing thereof, and then changing the slew rate, wherein:
   said controller controls the execution of the execution step identified by the table.

5. The disk drive according to claim 4, wherein:
   said table includes, as an error recovery step in read processing, a step of increasing and/or decreasing the slew rate.

6. The disk drive according to claim 4, wherein:
   said controller executes check processing of checking data that has been written by the head element in write processing; and
   said table includes, as an error recovery step in the write processing, a step of increasing the slew rate.

7. A control method of a disk drive, said disk drive comprising:
   a slider that flies above a rotating disk;
   a head element located at the slider; and
   a heater that uses thermal expansion to cause the head element to protrude so that the clearance between the head element and the disk is adjusted, said heater being located at the slider,
   said control method comprising the steps of:
   determining a slew rate of the output to the heater in response to processing conditions; and
   driving the heater at the determined slew rate,
   wherein the slew rate of the output to the heater is changed on the basis of the detected temperature,
   wherein:
   in read processing and/or write processing, said controller determines the slew rate of the output to the heater so that a slew rate on the low temperature side becomes higher than or equal to that on the high temperature side.

8. The method according to claim 7, wherein:
at the time of error recovery processing performed in read processing and/or write processing, a slew rate of the output to the heater is changed.

9. The method according to claim 7, wherein:
the slew rate of the output to the heater is changed according to head switching in read processing and/or write processing.

10. A disk drive comprising:
a slider that flies above a rotating disk;
a head element located at the slider;
a heater that uses thermal expansion to cause the head element to protrude so that the clearance between the head element and the disk is adjusted, said heater being located at the slider;
a controller for determining a slew rate of the output to the heater in response to processing conditions;
a heater driving circuit for driving the heater at the determined slew rate,
wherein in read processing and/or write processing, while the head element is accessing the disk, the driving circuit makes the slew rate of the output to the heater lower than that at the time of starting the access.

11. The disk drive according to claim 10, wherein:
said driving circuit decreases the slew rate of the output to the heater according to the number of times a read control signal and/or a write control signal received from the controller has been changed.

* * * * *